(12) United States Patent
Wang et al.

(10) Patent No.: US 11,042,308 B2
(45) Date of Patent: Jun. 22, 2021

(54) MEMORY MANAGEMENT APPARATUS AND MEMORY MANAGEMENT METHOD

(71) Applicant: MACRONIX International Co., Ltd., Hsinchu (TW)

(72) Inventors: Wei-Chen Wang, Taipei (TW); Ping-Hsien Lin, Taipei (TW); Tse-Yuan Wang, Kinmen County (TW); Yuan-Hao Chang, Taipei (TW); Tei-Wei Kuo, Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 11 days.

(21) Appl. No.: 16/742,811

(22) Filed: Jan. 14, 2020

(65) Prior Publication Data

US 2020/0319803 A1 Oct. 8, 2020

Related U.S. Application Data

(60) Provisional application No. 62/828,491, filed on Apr. 3, 2019.

(51) Int. Cl.
*G06F 3/06* (2006.01)
*G06F 16/901* (2019.01)
*G06F 12/10* (2016.01)

(52) U.S. Cl.
CPC ............ *G06F 3/0616* (2013.01); *G06F 3/064* (2013.01); *G06F 3/0679* (2013.01); *G06F 12/10* (2013.01); *G06F 16/9024* (2019.01); *G06F 2212/1036* (2013.01)

(58) Field of Classification Search
None
See application file for complete search history.

(56) References Cited

U.S. PATENT DOCUMENTS

2019/0121742 A1* 4/2019 Bhimani ............. G06F 12/0246
2021/0064543 A1* 3/2021 Yang .................. G06F 12/0253

* cited by examiner

*Primary Examiner* — Kevin Verbrugge
(74) *Attorney, Agent, or Firm* — J.C. Patents

(57) ABSTRACT

A memory management method includes: performing a bloom filtering operation on a plurality of logic block addresses to determine a read and written frequency of each of the logic block addresses; setting a first program/erase (P/E) cycle threshold and a second P/E cycle threshold value, wherein the first P/E cycle threshold value is smaller than the second P/E cycle threshold value; dividing each of physical memory blocks into a first type memory block, a second type memory block or a third type memory block according to the first P/E cycle threshold value and the second P/E cycle threshold value; and, allocating each of the logic block addresses to the first type memory block, the second type memory block or the third type memory block according to the read and written frequency of corresponding logic block addresses.

16 Claims, 8 Drawing Sheets

MEMORY MANAGEMENT APPARATUS AND MEMORY MANAGEMENT METHOD

CROSS-REFERENCE TO RELATED APPLICATION

This application claims the priority benefit of U.S. provisional application Ser. No. 62/828,491, filed on Apr. 3, 2019. The entirety of the above-mentioned patent application is hereby incorporated by reference herein and made a part of this specification.

BACKGROUND

Technical Field

The invention relates to a memory management apparatus and a memory management method. More particularly, the invention relates to the memory management method capable of accelerating read speed and increasing wear leveling performance.

Description of Related Art

With an advancement of electronic technologies, an electronic device is a popular daily tool for human's life. For providing high efficiency service, the electronic device always needs a good performance non-volatile memory.

In recently year, one logic data block in the non-volatile memory needs to provide a function with "write once and read multiple" application. Since an elder physical memory block has a lower reliability. If the read multiple function is applied on a physical memory block with higher program erase (P/E) cycle, a data read latency is largely increased because of an error correction code (ECC) operation, and an efficiency of the non-volatile memory is reduced.

SUMMARY

The invention provides a memory management apparatus and a management method thereof for read acceleration and wear leveling for a non-volatile memory.

The memory management method is adapted for a non-volatile memory having a plurality of physical memory blocks. The memory management method includes: performing a bloom filtering operation on a plurality of logic block addresses to determine a read and written frequency of each of the logic block addresses; setting a first program/erase (P/E) cycle threshold and a second P/E cycle threshold value, wherein the first P/E cycle threshold value is smaller than the second P/E cycle threshold value; dividing each of the physical memory blocks into a first type memory block, a second type memory block or a third type memory block according to the first P/E cycle threshold value and the second P/E cycle threshold value; and, allocating each of the logic block addresses to the first type memory block, the second type memory block, the third type memory block or the fourth type memory block according to the read and written frequency of corresponding logic block addresses.

The memory management apparatus includes a non-volatile memory and a controller. The non-volatile memory has a plurality of physical memory blocks. The controller is coupled to the non-volatile memory, and is configured to: perform a bloom filtering operation on a plurality of logic block addresses to determine a read and written frequency of each of the logic block addresses; set a first program/erase (P/E) cycle threshold and a second P/E cycle threshold value, wherein the first P/E cycle threshold value is smaller than the second P/E cycle threshold value; divide each of the physical memory blocks into a first type memory block, a second type memory block a third type memory block or a fourth type memory block according to the first P/E cycle threshold value and the second P/E cycle threshold value; and, allocate each of the logic block addresses to the first type memory block, the second type memory block, the third type memory block or the fourth type memory block according to the read and written frequency of corresponding logic block addresses.

To sum up, the memory management method of presented disclosure allocates physical memory blocks with multiple types to each of the logic block addresses according to the read and written frequency of corresponding logic block addresses, wherein the types of the physical memory blocks are determined by P/E cycles thereof. That is, all of the physical memory blocks can be used adaptively to reduce an aging of each of the physical memory blocks. Furthermore, during a data reading operation, an operation time for an error-correction code (ECC) operation can be saved to accelerate data reading speed, and a life time of the non-volatile memory can be enhanced by good wear leveling operation.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
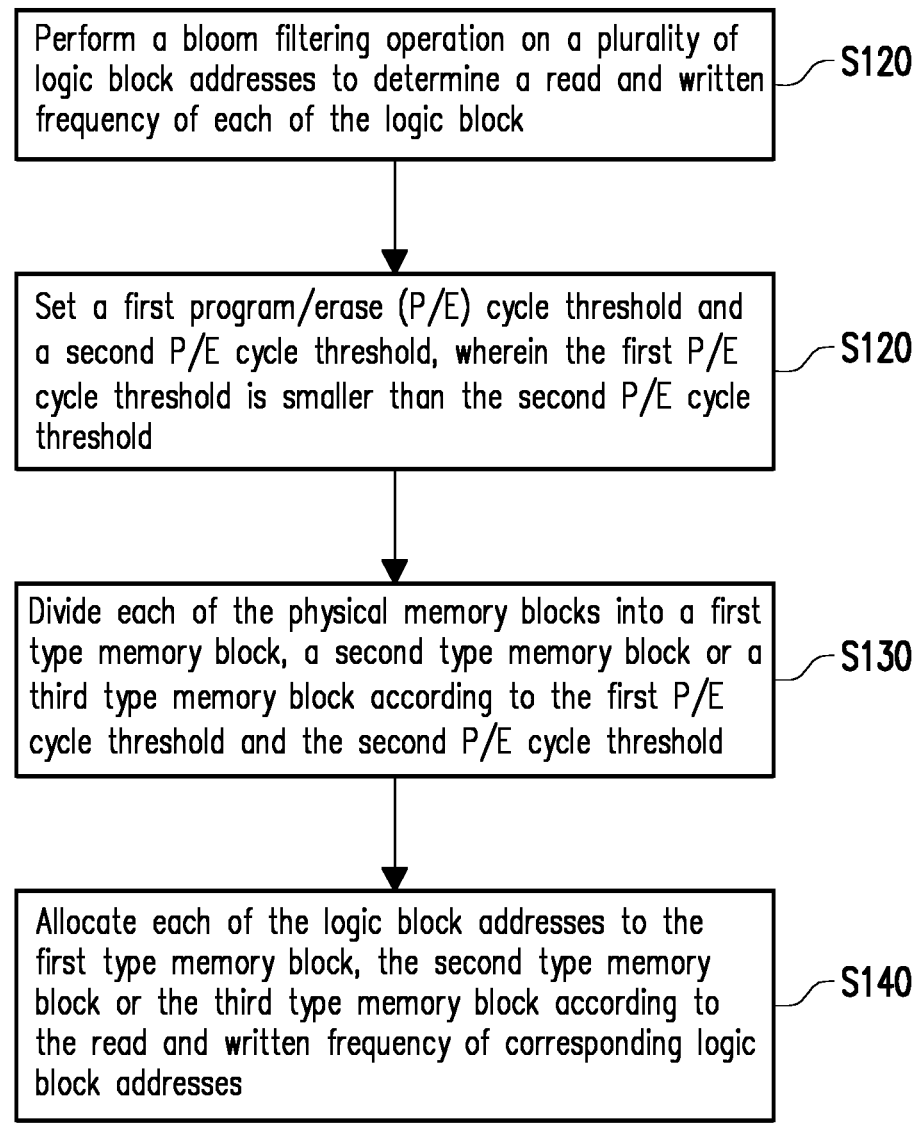
FIG. 1 is a flow chart of a memory management method according to an embodiment of present disclosure.

With reference to FIG. 1, FIG. 1 is a flow chart of a memory management method according to an embodiment of present disclosure. The memory management method is adapted for a non-volatile memory having a plurality of physical memory blocks. Firstly, a step S110 is used to perform a bloom filtering operation on a plurality of logic block addresses to determine a read and written frequency of each of the logic block addresses. In presented embodiment, the read and written frequency of each of the logic block addresses includes a read frequency and a write frequency of corresponding logic block address. If the write frequency of the corresponding LBA is higher than a first preset value, the corresponding logic block address can be regards as a write-hot block; on the contrary, if the write frequency of the corresponding logic block address is not higher than the first preset value, the corresponding logic block address can be regards as a write-cold block. Furthermore, if the read frequency of the corresponding logic block address is higher than a second preset value, the corresponding logic block address can be regards as a read-hot block; on the contrary, if the read frequency of the corresponding logic block address is not higher than the second preset value, the corresponding logic block address can be regards as a read-cold block.

Figure 2:
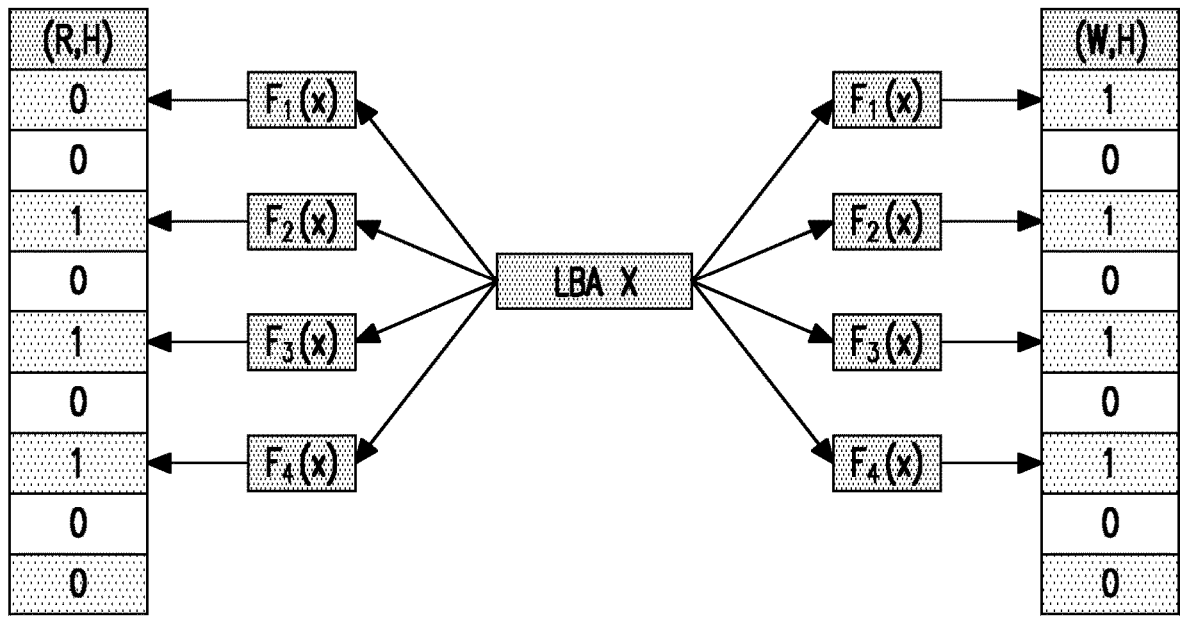
FIG. 2 is a schematic diagram of the bloom filtering operation according to an embodiment of present disclosure.

In here, the read and written frequency of each of the logic block addresses can be determined by performing the bloom filtering operation. The bloom filtering operation can be executed according to one or more hash function(s). Please refer to FIG. 2, which is a schematic diagram of the bloom filtering operation according to an embodiment of present disclosure. In FIG. 2, a logic black address LBA X can be performed the bloom filtering operation according to a plurality of has functions $F_1(X)$-$F_4(X)$ to generate read filtering results and write filtering results, wherein the read frequency (R, H) and the write frequency (W, H) can be obtained according to the read filtering results and write filtering results, respectively. In FIG. 2, a plurality of bits of the read frequency (R, H) which are 0, 1, 1, 1 can be respectively generated by hash functions $F_1(X)$-$F_4(X)$, and a plurality of bits of the write frequency (W, H) which are 1, 1, 1, 1 can be respectively generated by hash functions $F_1(X)$-$F_4(X)$.

Based on a filtering result generated by the bloom filtering operation is always "false positive" and "never false negative", the bloom filtering operation may be performed on the logic black address LBA X a plurality of times to increase a reliability of the read and write frequency. Since the first bit of the read frequency (R, H) is 0, the logic black address LBA X is the read-hot block can be determined. On the other hand, since all the bits of the write frequency (W, H) are 1, the logic black address LBA X may be the write-cold block can be determined. It should be noted here, in FIG. 2, the logic black address LBA X may be not the write-cold block, since the "false positive" characteristic of the bloom filter operation.

Figure 3:
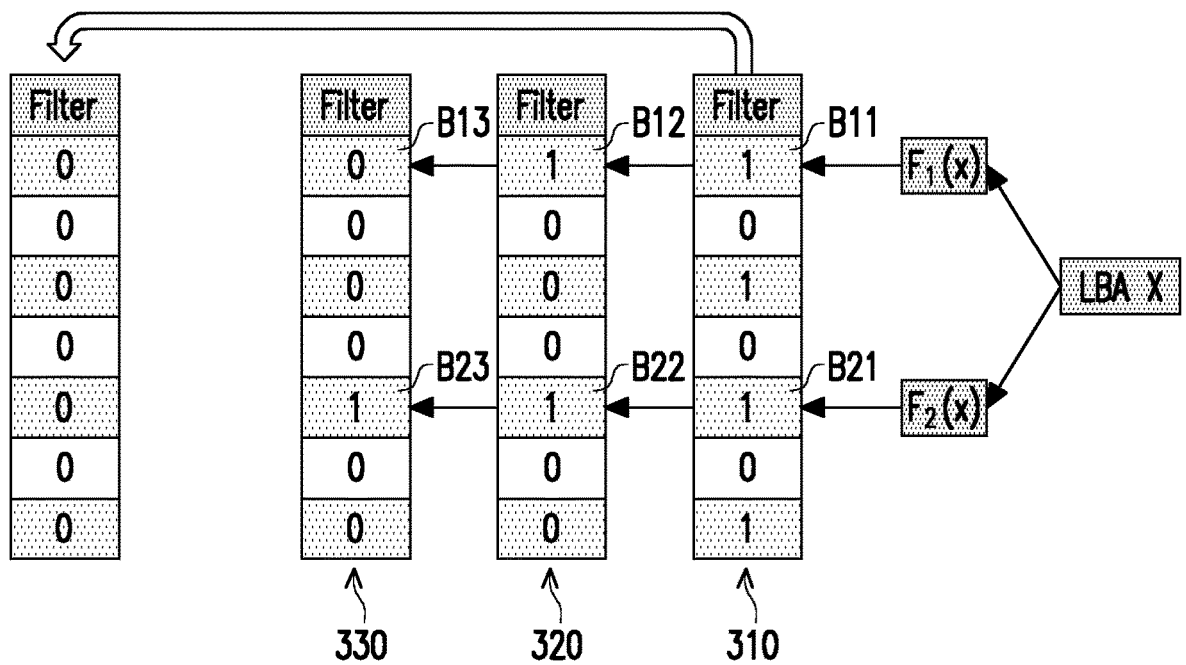
FIG. 3 is a schematic diagram of the bloom filtering operation according to another embodiment of present disclosure.

Please refer to FIG. 3, which is a schematic diagram of the bloom filtering operation according to another embodiment of present disclosure. For reducing an error probability of the filtering result, the bloom filtering operation may be performed on the logic black address LBA X several times (i.e. three times) according to 2 hash functions $F_1(X)$ and $F_2(X)$. In FIG. 3, three filtering results 310-330 can be respectively generated by three times bloom filtering operations, bits B11-B13 are generated in sequence by the hash functions $F_1(X)$, and bits B21-B23 are generated in sequence by the hash functions $F_2(X)$. If the three bits are all 1, the logic black address LBA X may be the read-cold block or the write-cold block, and if at least one of the three bits is 0, the logic black address LBA X is certainly the read-hot block or the write-hot block.

On the other hand, all bits of the filtering result may be reset to 0 after a plurality of times of the bloom filtering operations have been operated.

After the read frequency and the write frequency have been determined, the read and written frequency of the logic block address LBA X can determined. The read and written frequency of the logic block address LBA X may be used to indicate the logic block address LBA X is a read-hot and write-hot block, a read-hot and write-cold block, a read-cold and write-hot block, or a read-cold and write-cold block.

Please refer to FIG. 1 again, a step S120 is used to set a first program/erase (P/E) cycle threshold and a second P/E cycle threshold value, wherein the first P/E cycle threshold value is smaller than the second P/E cycle threshold value. Then, a step S130 is used to divide each of the physical memory blocks of the into a first type memory block, a second type memory block or a third type memory block according to the first P/E cycle threshold value and the second P/E cycle threshold value.

Figure 4:
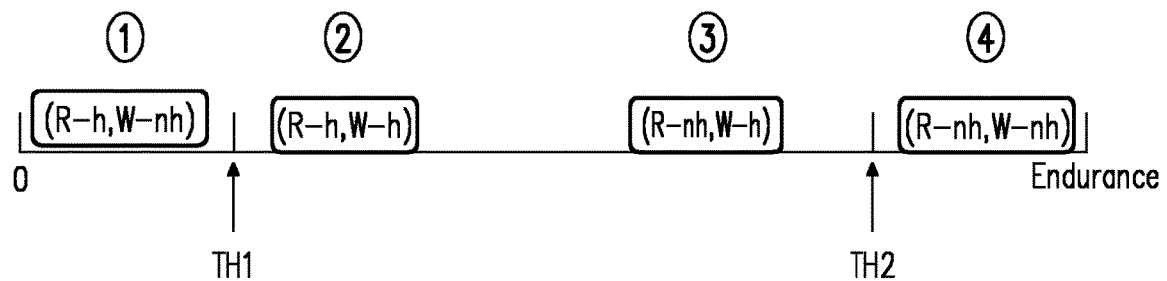
FIG. 4 is a schematic diagram for an allocation scheme for the physical blocks of the non-volatile memory according to an embodiment of present disclosure.

Please refer to FIG. 1 and FIG. 4 commonly. FIG. 4 is a schematic diagram for an allocation scheme for the physical blocks of the non-volatile memory according to an embodiment of present disclosure. In detail, a P/E cycle of each of the physical memory blocks can be compared with the first P/E cycle threshold value TH1 and the second P/E cycle threshold value TH2. If the P/E cycle of the corresponding physical memory block is smaller than the first P/E cycle threshold value TH1, the corresponding physical memory block can be determined to be the first type memory block. Besides, if the P/E cycle of the corresponding physical memory block is larger than the second P/E cycle threshold value TH2, the corresponding physical memory block can be determined to be the third type memory block. Furthermore, if the P/E cycle of the corresponding physical memory block is between the first P/E cycle threshold value TH1 and the second P/E cycle threshold value TH2, the corresponding physical memory block can be determined to be the second type memory block.

In a step S140 in FIG. 1, each of the logic block addresses is allocated to the first type memory block, the second type memory block or the third type memory block according to the read and written frequency of corresponding logic block addresses. In FIG. 4, if a first logic block address is determined to be read-hot and write-cold block (R-h, W-nh) according to a read and written frequency thereof, the first logic block address may be allocated to the first type memory block; if a second logic block address is determined to be read-hot and write-hot block (R-h, W-h) according to a read and written frequency thereof, the second logic block address may be allocated to the second type memory block; if a third logic block address is determined to be read-cold and write-hot block (R-nh, W-h) according to a read and written frequency thereof, the third logic block address may be also allocated to the second type memory block; and if a fourth logic block address is determined to be read-cold and write-cold block (R-nh, W-nh) according to a read and written frequency thereof, the fourth logic block address may be allocated to the third type memory block. In this embodiment, P/E cycles of the read-hot and write-hot blocks (R-h, W-h) are smaller than P/E cycles of the read-cold and write-hot blocks (R-nh, W-h) blocks.

In presented embodiment, the first type memory block may be youngest physical memory block, and the third type memory block may be eldest physical memory block.

Figure 5:
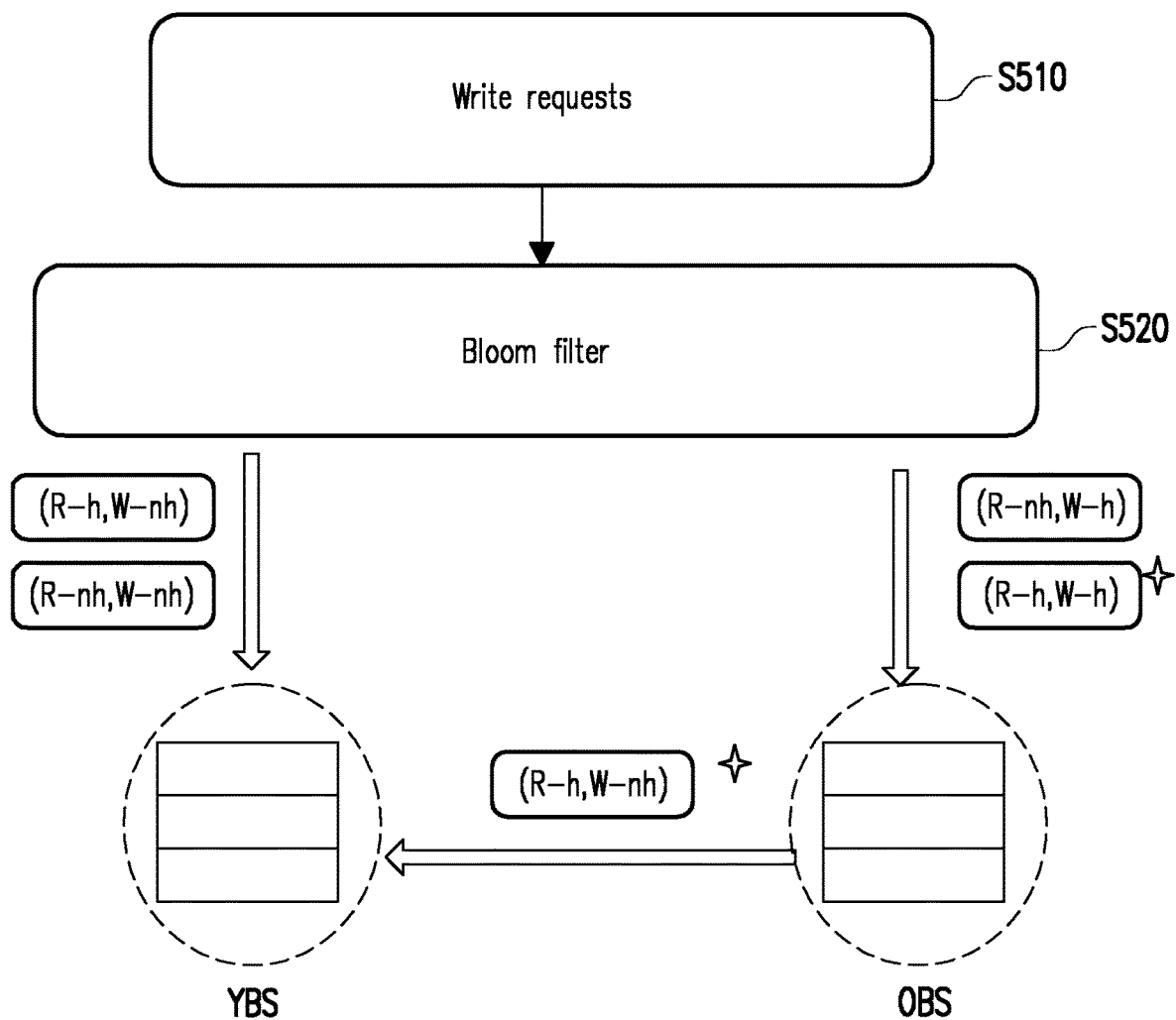
FIG. 5 is a schematic diagram for space allocation according to an embodiment of present disclosure.

Please refer to FIG. 5, which is a schematic diagram for space allocation according to an embodiment of present disclosure. In a step S510, a write request to the non-volatile memory is received, and a bloom filter is applied for performing on a logic block address of the write request. The bloom filter is used to determine a read and write frequency of the logic block address, and the read and write frequency may be the read-hot and write-cold block (R-h, W-nh), the read-cold and write-cold block (R-nh, W-nh), the read-cold and write-hot block (R-nh, W-h), or the read-hot and write-hot block (R-h, W-h).

In here, physical memory blocks are divided into two groups including younger physical memory blocks YBS and elder physical memory blocks OBS, wherein each younger physical memory block YBS has lower erase count than each elder physical memory block OBS. If the logic block address is determined to be the read-hot and write-cold block (R-h, W-nh) or the read-cold and write-cold block (R-nh, W-nh), the logic block address may be allocated to one of the younger physical memory blocks YBS. On the other hand, if the logic block address is determined to be the read-cold and write-hot block (R-nh, W-h) or the read-hot and write-hot block (R-h, W-h), the logic block address may be allocated to one of the elder physical memory blocks OBS.

On the other hand, if the read and write frequency of the logic block address is updated, and the logic block address is adjusted from the read-hot and write-hot block (R-h, W-h) to the read-hot and write-cold block (R-h, W-nh), the logic block address can be relocated to one of the elder physical memory blocks OBS which is adjacent to the younger physical memory blocks YBS.

In FIG. 5, the younger physical memory blocks YBS may be the first type memory blocks and first group blocks of the second type memory blocks in FIG. 4, and the elder physical memory blocks OBS may be second group blocks of the second type memory blocks and the third type memory blocks in FIG. 4.

Figure 6A:
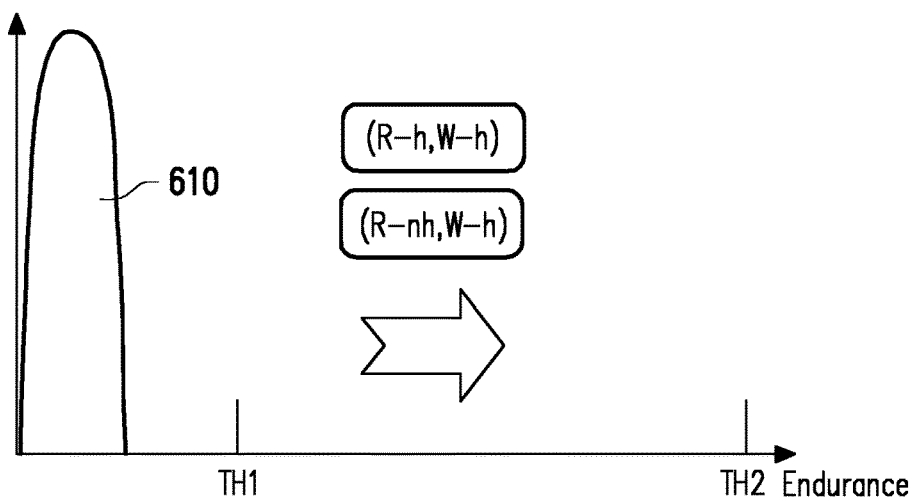
FIG. 6A to FIG. 6G are schematic diagram of data migration flow for wear leveling scheme according to an embodiment of presented disclosure.

Please refer to FIG. 6A to FIG. 6G, which are schematic diagram of data migration flow for wear leveling scheme according to an embodiment of presented disclosure. In FIG. 6A, in an initial state, the P/E cycles of all of the physical memory blocks are smaller than a first P/E cycle threshold value TH1. All of the physical memory blocks are within a first distribution 610.

By receiving an access request for the non-volatile memory, a read and write frequency of a logic block address can be determined. At the same time, a part of the physical memory blocks may move toward to a right direction of FIG. 6A. In presented embodiment, the logic block address which is read-cold and write-hot block (R-nh, W-h) may be allocated to the part of the physical memory blocks, and then, the logic block address which is read-hot and write-hot block (R-h, W-h) may be allocated to the part of the physical memory blocks, and a second distribution 620 shown in FIG. 6B can be formed.

Figure 6B:
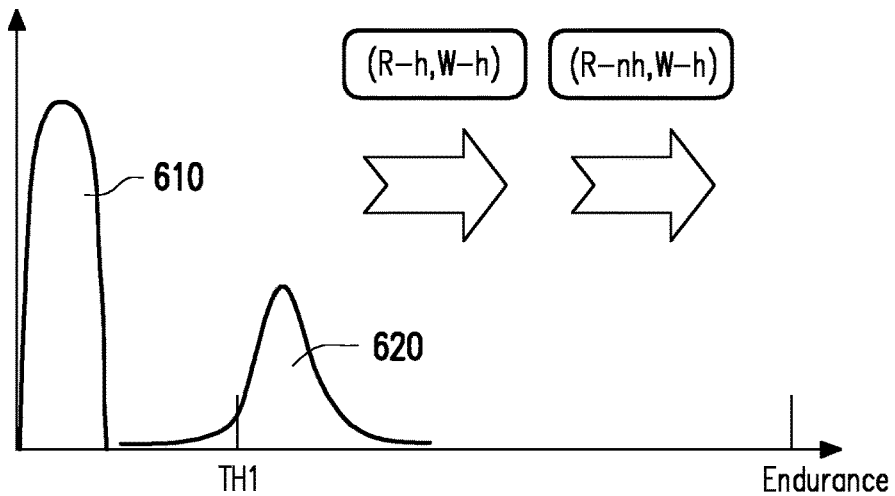

In FIG. 6B, the second distribution 620 may be moved toward to the right direction and cross over the first P/E cycle threshold value TH1.

Figure 6C:
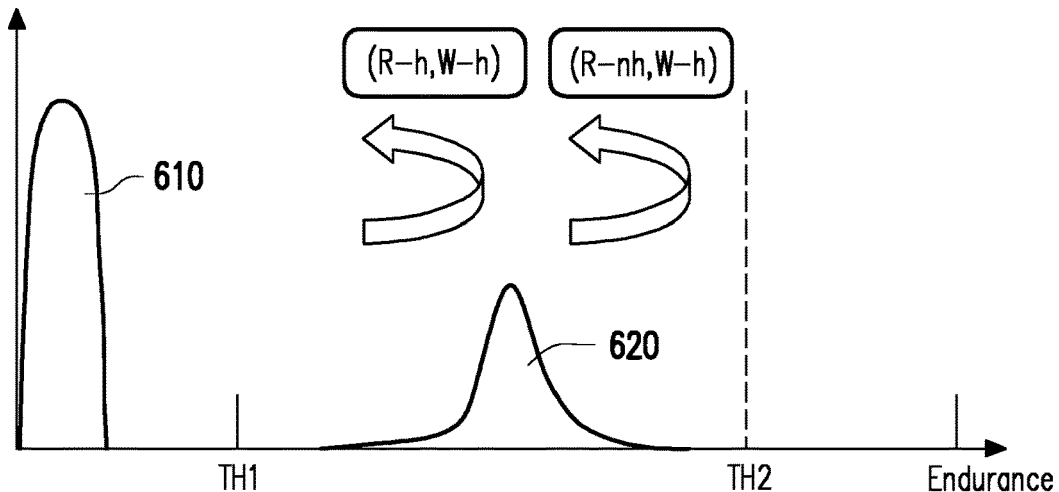

In FIG. 6C, a logic block address being the read-hot and write-hot block (R-h, W-h) can be re-allocated to one of the physical memory blocks within a left side the second distribution 620. The logic block address being the read-cold and write-hot block (R-nh, W-h) may be allocated to a right side of the physical memory blocks within the second distribution 620. The physical memory block in the right side of the second distribution 620 has larger P/E cycle than the physical memory block in the left side of the second distribution 620.

It should be noted here, for multiple data reading operation for the non-volatile memory, the logic block address which is the read-cold and write-hot block (R-nh, W-h) effects an operation efficiency less. Also, a data retention time for the read-hot and write-hot block (R-h, W-h) logic block address is short. Such as that, the logic block address which is the read-cold and write-hot block (R-nh, W-h) or the read-hot and write-hot block (R-h, W-h) can be allocated to the physical memory blocks with more P/E cycles. A speed of the data reading operation can be maintained correspondingly.

Figure 6D:
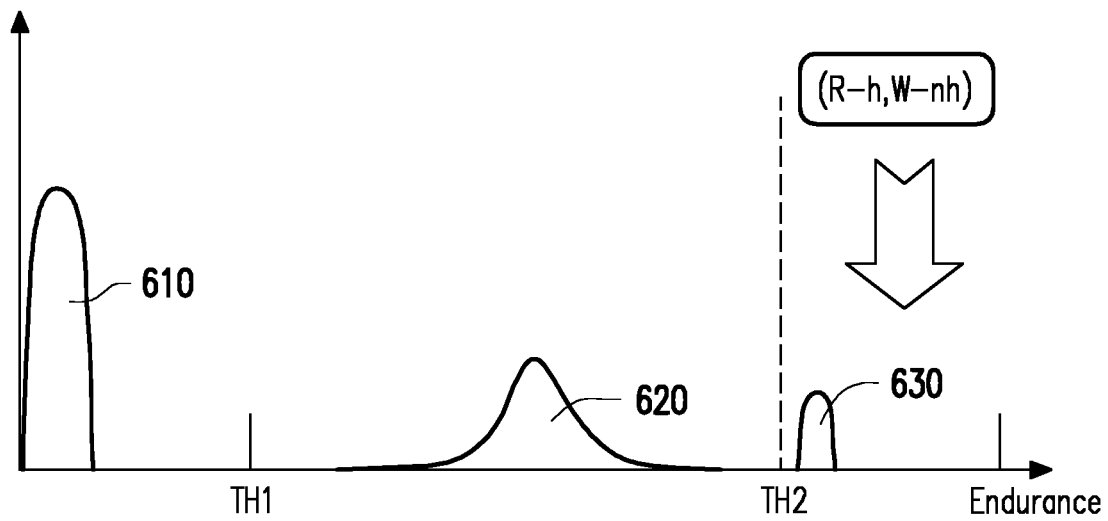

Please refer to FIG. 6D, when there is at least one physical memory block with P/E cycle larger than a second P/E cycle threshold value TH2, a third distribution 630 can be formed. At this time, a logic block address which is the read-cold and write-cold block (R-nh, W-nh) can be allocated to the physical memory block within the third distribution 630. That is, a movement of the third distribution 630 can be frozen, and life times of the physical memory block within the third distribution 630 can be extended. Additional, a logic block address with read-hot and write-cold block (R-h, W-nh) can be allocated to a physical memory block within the first distribution 610.

Figure 6E:
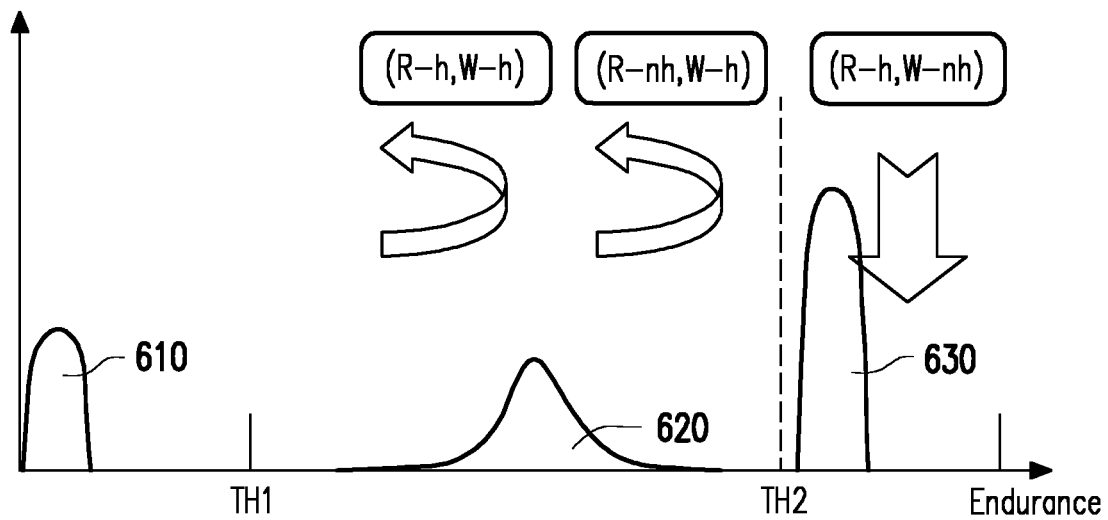

Please refer to FIG. 6E, as data accessing times for the non-volatile memory increasing, an area of the first distribution 610 may be decreased and an area of the third distribution 630 may be increased. The logic block address being the read-hot and write-hot block (R-h, W-h) or the read-cold and write-hot block (R-nh, W-h) can be allocated to one of the physical memory blocks whose P/E cycles is between the first P/E threshold value TH1 and the second P/E threshold value TH2. In this embodiment, for example, a first logic block address being the read-hot and write-hot block (R-h, W-h) can be allocated to a first physical memory block and a second logic block address being the read-cold and write-hot block (R-nh, W-h) can be allocated to a second physical memory block, wherein a P/E cycle of the first logic block address may be smaller than a P/E cycle of the second logic block address.

Figure 6F:
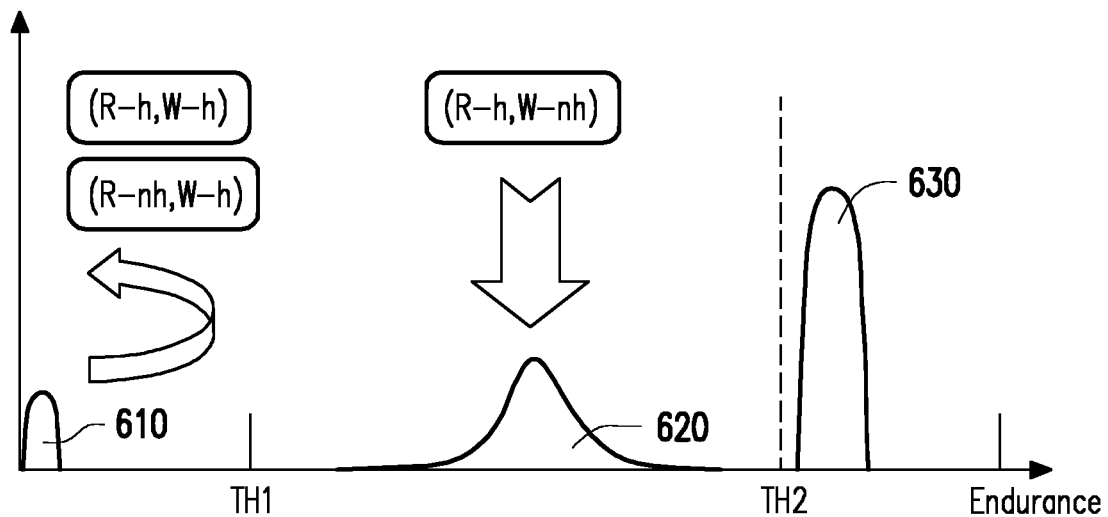

In FIG. 6F, for increasing usage of physical memory blocks within the first distribution 610, a logic block address being the read-cold and write-hot block (R-nh, W-h) or the read-hot and write-hot block (R-h, W-h) can be re-allocated to one of the physical memory blocks within the first distribution 610. At this time, a logic block address being the read-hot and write-cold block (R-h, W-nh) may be allocated to one of the physical memory blocks within the second distribution 620, and a movement speed of the second distribution 620 may be frozen.

Figure 6G:
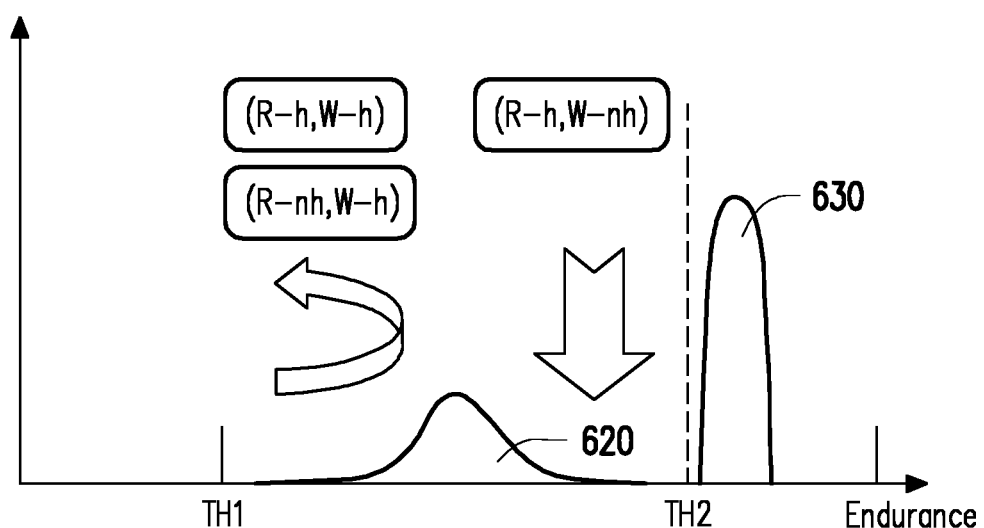

In FIG. 6G, the first distribution 610 is disappeared. The logic block address being the read-cold and write-hot block (R-nh, W-h) or the read-hot and write-hot block (R-h, W-h) can be re-allocated to one of the physical memory blocks within a left side the second distribution 620. The logic block address being the read-hot and write-cold block (R-h, W-nh) may be allocated to a right side of the physical memory blocks within the second distribution 620.

Figure 7:
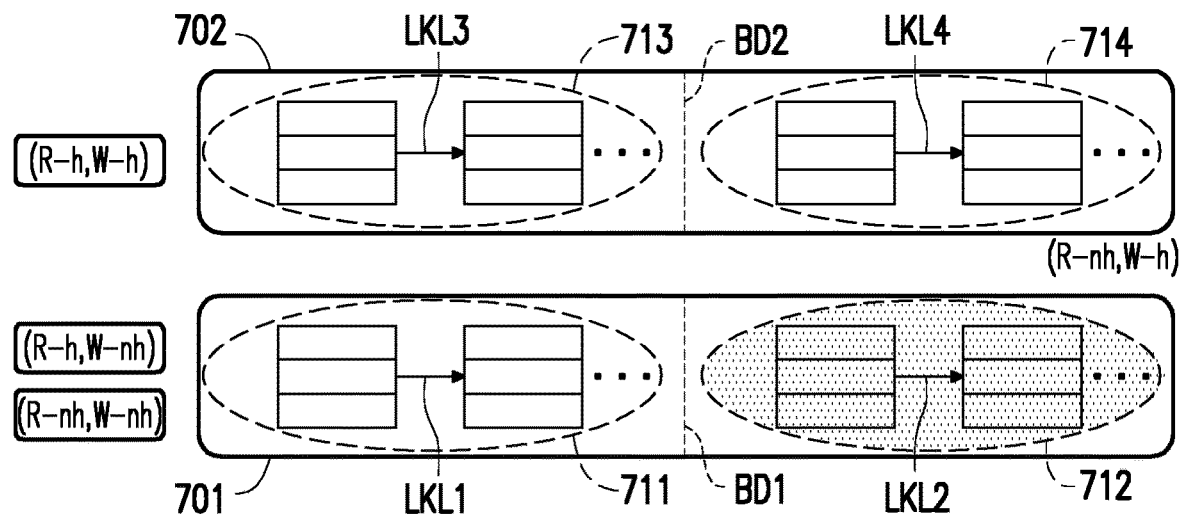
FIG. 7 is a schematic diagram of a free block management scheme according to an embodiment of presented disclosure.

Please refer to FIG. 7, which is a schematic diagram of a free block management scheme according to an embodiment of presented disclosure. In FIG. 7, free memory blocks (physical memory blocks) may be divided into two pools 701 and 702 according to P/E cycles thereof, wherein the first pool 701 may be younger than the second pool 702. Moreover, each of the pools 701 and 702 is divided into two parts 711-712 and 713-714 by pool bounds BD1 and BD2, and the physical memory blocks in each of the parts 711-712 and 713-714 are coupled by a link list data structure LKL1-LKL4, respectively. By using the link list data structure LKL1-LKL4, a round-robin scheme can be applied for physical memory allocating, and a well wear leveling can be performed.

Figure 8:
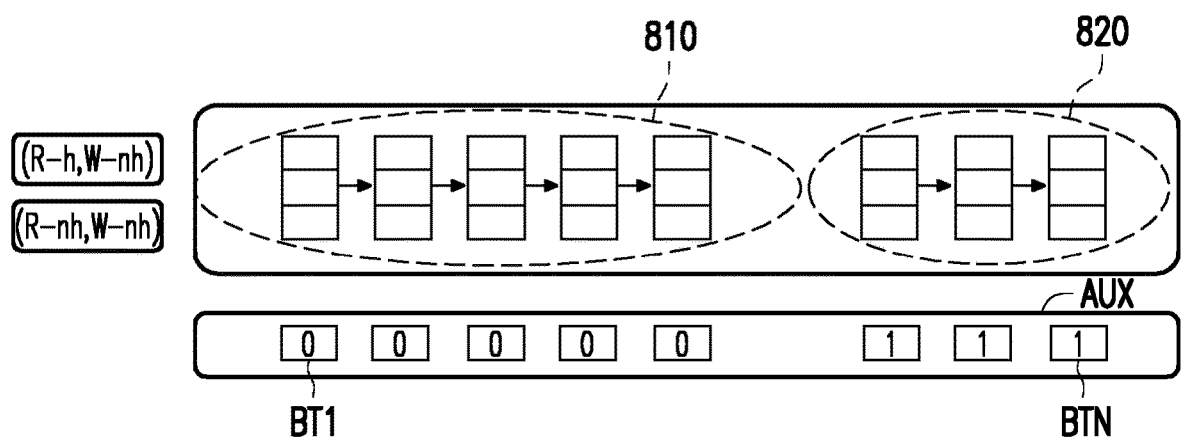
FIG. 8 is a schematic diagram of a free block management scheme according to another embodiment of presented disclosure.

Please refer to FIG. 8, which is a schematic diagram of a free block management scheme according to another embodiment of presented disclosure. In FIG. 8, an auxiliary table AUX is established for recording read times of the logical memory block addresses. The auxiliary table AUX may have a plurality of bits BT1-BTN respectively corresponding to a plurality of logical memory block addresses. If read times of a first block address corresponding to the bit BT1 is not larger than a threshold value, the bit BT1 can be recorded as logic 0 to indicate the first block address is the read-cold block. If read times of a second block address corresponding to the bit BT2 is larger than the threshold value, the bit BTN can be recorded as logic 1 to indicate the first block address is the read-hot block.

The auxiliary table AUX can be used incorporated with the filtering result by the bloom filter, and whether a logic block address is read-hot or read-cold can be correctly determined.

Figure 9:
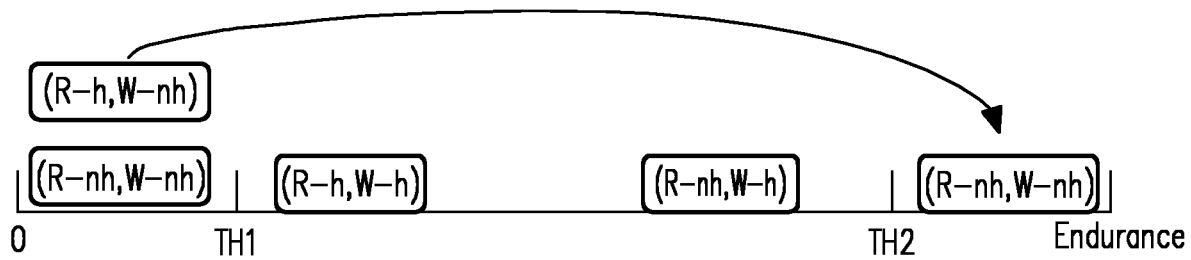
FIG. 9 is a schematic diagram of a free block management scheme according to another embodiment of presented disclosure.

Please refer to FIG. 9, which is a schematic diagram of a free block management scheme according to another embodiment of presented disclosure. In FIG. 9, in an initial state, a logic block address which is the read-cold and write-cold block (R-nh, W-hn) or the read-hot and write-cold block (R-nh, W-hn) can be allocated to a physical memory block with lower P/E cycle (less than a first P/E threshold value TH1). When there is at least one physical memory block with higher P/E cycle (higher than a second P/E threshold value TH2), the logic block address which is the read-cold and write-cold block (R-nh, W-hn) may be allocated to the physical memory block with higher P/E cycle. That is, the youngest physical memory blocks are allocated with the read-hot block and a performance of multiple reading operation on the non-volatile memory can be enhanced. Furthermore, by allocating the read-cold and write-cold block (R-nh, W-hn) to the eldest physical memory blocks, P/E cycles of the eldest physical memory blocks can be frozen to extend lift time of the non-volatile memory.

Figure 10:
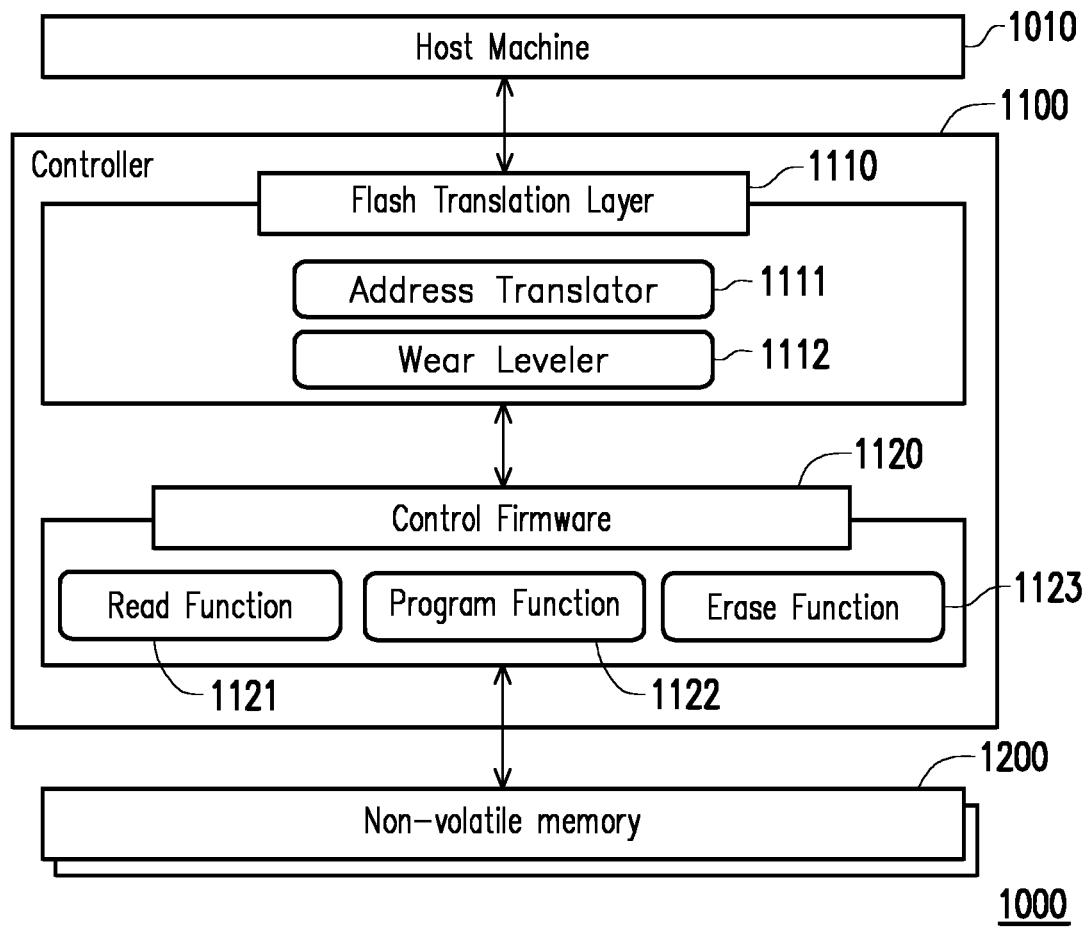
FIG. 10 is a schematic diagram of a memory management apparatus according to an embodiment of presented disclosure.

Please refer to FIG. 10, which is a schematic diagram of a memory management apparatus according to an embodiment of presented disclosure. The memory management apparatus 1000 is coupled a host machine 1010. The memory management apparatus 1000 includes a controller 1100 and a non-volatile memory 1200. The controller 1100 includes a flash translation layer (FTL) 1110 and a control firmware 1120. The FTL 1110 includes an address translator 1111 and a wear leveler 1112 for data migration and wear leveling schemes as mentioned in above embodiments. The control firmware 1120 is used to perform a read function 1121, a program function 1122 and an erase function 1123. The controller 1100 can be implemented by a circuit with computation ability and is well-known by a person skilled in this art, such as a processor. In presented embodiment, the non-volatile memory 1200 may be a flash memory.

In view of the foregoing, in this disclosure, physical memory blocks are divided into several types according to P/E cycles thereof. Furthermore, a read and written frequency of each of logic block addresses is determined by using bloom filtering operation. Such as that, each of the logic block addresses can be allocated to a physical memory block according to the read and written frequency of corresponding logic block addresses. That is, in multiple read operation for the non-volatile memory, a data read speed can be accelerated and a well wear leveling scheme can be performed on the non-volatile memory to increase a lift time thereof.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A memory management method, adapted for a non-volatile memory having a plurality of physical memory blocks, comprising:
    performing a bloom filtering operation on a plurality of logic block addresses to determine a read and written frequency of each of the logic block addresses;
    setting a first program/erase (P/E) cycle threshold and a second P/E cycle threshold value, wherein the first P/E cycle threshold value is smaller than the second P/E cycle threshold value;
    dividing each of the physical memory blocks into a first type memory block, a second type memory block, or a third type memory block according to the first P/E cycle threshold value and the second P/E cycle threshold value; and
    allocating each of the logic block addresses to the first type memory block, the second type memory block or the third type memory block according to the read and written frequency of corresponding logic block addresses.

2. The memory management method as claimed in claim 1, wherein the read and written frequency of each of the logic block addresses is used to indicate the corresponding logic block address is a read-hot and write-hot block, a read-hot and write-cold block, a read-cold and write-hot block, or a read-cold and write-cold block.

3. The memory management method as claimed in claim 2, wherein a step of performing the bloom filtering operation on the logic block addresses to determine the read and written frequency of each of the logic block addresses comprises:
    performing the bloom filtering operation on each of the logic block addresses a plurality of times, and generating a plurality of read filtering results and a plurality of write filtering results; and
    determining corresponding logic block address is the read-hot and write-hot block, the read-hot and write-cold block, the read-cold and write-hot block, or the read-cold and write-cold block according to the read filtering results and the write filtering results.

4. The memory management method as claimed in claim 2, wherein a step of allocating each of the logic block addresses to the first type memory block, the second type memory block or the third type memory block according to the read and written frequency of corresponding logic block addresses comprises:
    if a first logic block address is the read-hot and write-cold block, allocating the first logic block address to a first physical block being the first type memory block;
    if the first logic block address is the read-hot and write-hot block, allocating the first logic block address to a second physical block being the second type memory block;

if the first logic block address is the read-cold and write-hot block, allocating the first logic block address to a third physical block being the second type memory block; and if the first logic block address is the read-cold and write-cold block, allocating the first logic block address to a fourth physical block being the third type memory block.

5. The memory management method as claimed in claim 4, wherein the step of allocating each of the logic block addresses to the first type memory block, the second type memory block, or the third type memory block according to the read and written frequency of corresponding logic block addresses further comprises:

re-allocating the first logic block address to the first physical block, if the first logic block address is the read-cold and write-hot block or the read-hot and write hot block; and re-allocating a second logic block address to the second physical block or the third physical block, if the second logic block address is the read-hot and write-cold block.

6. The memory management method as claimed in claim 1, wherein a step of dividing each of the physical memory blocks into the first type memory block, the second type memory block or the third type memory block according to the first P/E cycle threshold value and the second P/E cycle threshold value comprises:

if a P/E cycle of each of the physical memory blocks is smaller than the first P/E cycle threshold value, dividing the corresponding physical memory block into the first type memory block;

if the P/E cycle of each of the physical memory blocks is larger than the second P/E cycle threshold value, dividing the corresponding physical memory block into the third type memory block; and if the P/E cycle of each of the physical memory blocks is between the first P/E cycle threshold value and the second P/E cycle threshold value, dividing the corresponding physical memory block into the second type memory block.

7. The memory management method as claimed in claim 1, further comprising:

establish an auxiliary table for recording read times of the logical memory block addresses.

8. The memory management method as claimed in claim 1, further comprising:

dividing a plurality of free physical memory blocks into a plurality of pools according P/E cycles of the free physical memory blocks; and dividing the free physical memory blocks in each of the pools into a plurality of parts by at least one pool bound; and coupling the free physical memory blocks in a same part of each of the pools by a link list data structure.

9. A memory management apparatus, comprising:

a non-volatile memory having a plurality of physical memory blocks; and a controller, coupled to the non-volatile memory, being configured to:

perform a bloom filtering operation on a plurality of logic block addresses to determine a read and written frequency of each of the logic block addresses;

set a first program/erase (P/E) cycle threshold and a second P/E cycle threshold value, wherein the first P/E cycle threshold value is smaller than the second P/E cycle threshold value;

divide each of the physical memory blocks into a first type memory block, a second type memory block or a third type memory block according to the first P/E cycle threshold value and the second P/E cycle threshold value; and allocate each of the logic block addresses to the first type memory block, the second type memory block, the third type memory block or the fourth type memory block according to the read and written frequency of corresponding logic block addresses.

10. The memory management apparatus as claimed in claim 9, wherein the read and written frequency of each of the logic block addresses is used to indicate the corresponding logic block address is a read-hot and write-hot block, a read-hot and write-cold block, a read-cold and write-hot block, or a read-cold and write-cold block.

11. The memory management apparatus as claimed in claim 10, wherein the controller is further configured to:

perform the bloom filtering operation on each of the logic block addresses a plurality of times, and generate a plurality of read filtering results and a plurality of write filtering results; and determine corresponding logic block address is the read-hot and write-hot block, the read-hot and write-cold block, the read-cold and write-hot block, or the read-cold and write-cold block according to the read filtering results and the write filtering results.

12. The memory management apparatus as claimed in claim 10, wherein the controller is further configured to:

if a first logic block address is the read-hot and write-cold block, allocate a first physical block being the first type memory block to the first logic block address;

if the first logic block address is the read-hot and write-hot block, allocate a second physical block being the second type memory block to the first logic block address;

if the first logic block address is the read-cold and write-hot block, allocate a third physical block being the second type memory block to the first logic block address; and if the first logic block address is the read-cold and write-cold block, allocate a fourth physical block being the third type memory block to the first logic block address.

13. The memory management apparatus as claimed in claim 10, wherein the controller is further configured to:

re-allocate the first logic block address to the first physical block, if the first logic block address is the read-cold and write-hot block or the read-hot and write hot block; and re-allocate a second logic block address to the second physical block or the third physical block, if the second logic block address is the read-hot and write-cold block.

14. The memory management apparatus as claimed in claim 10, wherein the controller is further configured to:

if a P/E cycle of each of the physical memory blocks is smaller than the first P/E cycle threshold value, divide the corresponding physical memory block into the first type memory block;

if the P/E cycle of each of the physical memory blocks is larger than the second P/E cycle threshold value, divide the corresponding physical memory block into the third type memory block; and if the P/E cycle of each of the physical memory blocks is between the first P/E cycle threshold value and the second P/E cycle threshold value, divide the corresponding physical memory block into the second type memory block.

15. The memory management apparatus as claimed in claim 10, wherein the controller is further configured to:
establish an auxiliary table for recording read numbers of the logical memory block addresses.

16. The memory management apparatus as claimed in claim 10, wherein the controller is further configured to:
divide a plurality of free physical memory blocks into a plurality of pools according P/E cycles of the free physical memory blocks; and
divide the free physical memory blocks in each of the pools into a plurality of parts by at least one pool bound; and
couple the free physical memory blocks in a same part of each of the pools by a link list data structure.

* * * * *